3,163,592
PROCESS FOR ELECTROPHORETICALLY APPLYING A COATING OF PHOSPHOR

Arthur W. Dolan, Peabody, and James Theodosopoulos, Ipswich, Mass., assignors to Sylvania Electric Products Inc., a corporation of Delaware
No Drawing. Filed Sept. 1, 1960, Ser. No. 53,345
3 Claims. (Cl. 204—181)

This invention relates to electroluminescent devices and to processes for manufacturing them.

Such devices ordinarily include a layer of solid electroluminescent phosphor in a solid dielectric material, and the dielectric now commercially used is generally a ceramic or glass, usually applied by mixing a glass frit with a powdered electroluminescent phosphor and fusing the same onto other parts of the lamp, such as an electrode or a dielectric layer.

Among the pieces to which such coatings are applied are metal pieces such as pointers for use with dials in indicating instruments. Such pointers have heretofore been coated by being dipped into a suitable suspension of the materials. This method has resulted in commercially useful devices, but undesirable variations from piece to piece have occurred in the finished result, and the electrical breakdown voltage has sometimes been reduced by microscopic pits in the resultant coating.

We have found that such difficulties can be reduced or eliminated by applying the coating electrophoretically. The conducting part to be coated is placed in a suitable suspension and a proper unidirectional voltage applied between it and another electrode in the same suspension. The first coat applied to the piece can be a ground coat, if desired, and even though that is generally an insulating coat, a second coat can nonetheless be applied over it.

The process can be either anaphoretic or cataphoretic, depending on the materials used. With the glass frits used below, the process was cataphoretic; that is, the coating was deposited on the negative electrode. With the suspension which contained phosphor, the process was anaphoretic.

The coatings produced by our process have been very uniform and were closely reproducible from batch to batch. In addition, pinholes in the coating were greatly reduced in number or even eliminated, resulting in a much higher electrical breakdown voltage for the coating.

Other advantages, features and objects of the invention will be apparent from the following specification.

In one example of the invention, the following suspension was used:

600 cc. distilled water
1200 cc. methanol
45 g. urea
9 cc. carbowax 350
250 g. glass frit Carbowax 350 is a water-soluble, non-volatile solid polyethylene glycol. Other plasticizers can be used.

The suspension is placed in a suitable container with an electrode placed therein. A pointer of sheet steel, or so-called "No. 4 Alloy," in the form of a hollow rod of 0.001 inch thick material about two inches long and 1/16 inch outside diameter, was placed in the suspension as a second electrode and connected to a source of unidirectional (i.e., direct current) voltage, the pointer being connected to the negative terminal of the voltage source and the other electrode to the positive. The other electrode can be of a 24-gauge stainless steel cylinder about 2½ inches inside diameter coaxial with the pointer rod and about 2½ inches high. It should generally be larger than the pointer to be coated.

The voltage is switched on after the pointer is in suspension and may have a value of from about 20 to 100 volts and preferably about thirty volts for the solution and electrode used. The voltage may remain switched on for about 2 to 10 seconds, preferably about 5 seconds, after which the coated pointer is removed from the solution and air dried. The resultant coating of frit can then be fused to the pointer rod by heating to about 700° C. The pointer rod will then have a ground coat of high dielectric constant.

A coating of a mixture of glass frit and powdered electroluminescent phosphor can then be applied. This can be applied over the ground coat by spraying or dipping, if desired, but the uniformity and breakdown strength of the coating will be greatly improved if the phosphor-frit coating is applied electrophoretically.

The suspension for the latter coating can be as follows:

500 gms. phosphor
600 gms. glass frit C
550 gms. Pent-Acetate (a mixture of synthetic amyl acetate and amyl alcohols marketed under the registered trademark Pent-Acetate.)

In using this suspension, the procedure is the same as before except that the pointer to be coated is connected to the positive electrode and that the voltage should be higher, generally about 500 to 1500 volts, preferably 1000 volts because of the lower conductivity of the Pent-Acetate and the presence of the ground coat. The voltage can remain on for about 2 to 10 seconds, preferably about 5 seconds. The pointer is then removed and dried.

The phosphor and frit preparation can be varied considerably, depending on the composition desired in the finished coat. For the same total weight of phosphor and frit, the Pent-Acetate content can be between 400 to 700 gms., but 550 is preferable. The total phosphor-frit weight can vary between similar limits.

A transparent conductive coating can then be applied in the usual manner over the coating of phosphor and frit, for example as shown in U.S. patent application Ser. No. 365,617, filed July 2, 1953, now abandoned, by R. M. Rulon. Glass frit C can be one of those shown in said application, preferably a substantially lead-free zinc borosilicate glass such as glass No. 5 on page 4 of said application.

Various other compositions can be used. The phosphor employed can be that shown in a United States patent application, Ser. No. 705,750, filed December 30, 1957, now Patent No. 2,982,740, by Goldberg et al., or another electroluminescent phosphor.

The glass frit A used in the application of the ground coat can be the material shown in Rindone's U.S. Patent 2,906,631, issued September 29, 1959. The frit may be easier to apply in production if about 10% by weight of potassium and 2% by weight of aluminum is added, and if the amount of silca is about 30% greater by weight than that in the specific example of the Rindone patent.

Other frits can be used, preferably such as to give a high dielectric constant.

Where materials differing widely from those mentioned above are employed, the proper suspension to use can be determined by first mixing, with one part by weight of the powder to be suspended, about four parts by weight of distilled water of known conductivity value. The mixing can be done in a laboratory mixer. The ability of the water to disperse the powder is determined by checking the time for the particles to settle to the bottom of the beaker, which should be about an hour, and by also checking whether any of the finer particles, that is, those below a micron in diameter, remain suspended in the water for a definite time. If the powder settles slowly and the separation layers are rather indefinite, and the sediment is hard packed, a high percentage of the finer particles remain in suspension, then we pass on to the next part of the test, since the foregoing characteristics would indicate an excellent dispersing meduim for the powder in question. If no success is obtained with water, then the test is repeated with other less universal solvents such as the alcohols, ketones and lacquers, until a satisfactory one is found. Hydrocarbons can also be used.

The test can then proceed by immersing two electrodes, one connected to the negative terminal of a power pack and the other to the positive terminal, into such a beaker full of the liquid powder dispersion. A volt meter is connected across the power pack and a milli-ammeter is connected in series with the probes to read the current drawn through the suspension. A D.C. voltage of about the values previously given is applied and the current noted. If the powder has natural electrophoretic tendencies, then a deposit will be noted on either the positive or negative probe, and this indicates whether the powder in suspension is suited for deposit anaphoretically or cataphoretically. That is, if the deposit is on the negative electrode, the liquid is most suitable for deposit cataphoretically, and if on the positive electrode, anaphoretically.

Extreme cases, which are sometimes noted and which prevent deposit are, (1) no conductivity and (2) excessive conductivities. In the case of the former, it is necessary to increase the conductivity by adding a suitable ionizable compound. If excessive conductivities are noted at low operating voltages, then this is an indication that too many medium soluble ionizable impurities remain for good deposition. These will cause rapid agglomeration of powder particles and prevent practical suspension development. The procedure in that case is to wash the powder in the liquid used, to filter and discard the solvent and to repeat the entire procedure until the conductivity is reduced to a suitable value.

Although the invention has been described with reference to the coating of pointers, it can be used in the coating of various other shapes of electroluminescent devices.

What we claim is:

1. The method of producing a coating of electroluminescent phosphor in glass in an electroluminescent device, said method comprising anaphoretically depositing the phosphor and a glass frit from a suspension thereof in a suitable liquid, and then heating the frit to embed the phosphor in said frit and fuse to the remainder of the device.

2. The method of coating an electroluminescent device, said method comprising: coating an electrode for such a device with an insulating coating, then connecting said insulated electrode as an electrode for electrophoretic deposition in a suspension of electroluminescent phosphor and frit in a suitable liquid, applying a voltage between said insulated electrode and another electrode in contact with said suspension to coat said insulated electrode electrophoretically, removing the insulated electrode from the suspension after a coating of phosphor and frit has deposited on it, and then heating the frit to embed the phosphor in said frit and fuse the resultant mixture to said insulating coating.

3. The method of coating an electroluminescent device, said method comprising electrophoretically coating an electrode for such a device with an insulating coating with said electrode negative, then electrophoretically applying a coating of phosphor and glass frit to said insulating coating with said electrode positive.

References Cited by the Examiner

UNITED STATES PATENTS

| 2,321,439 | 6/43 | Verwey | 204—181 |
| 2,851,408 | 9/58 | Cerulli | 204—181 |
| 2,966,449 | 12/60 | Bouchard | 204—181 |

FOREIGN PATENTS

| 843,102 | 8/60 | Great Britain. |
| 444,723 | 3/36 | Great Britain. |
| 484,777 | 5/38 | Great Britain. |

OTHER REFERENCES

Roehl: Metal Finishing, May 1944, pages 313–316.

JOHN H. MACK, *Primary Examiner.*

JOHN R. SPECK, *Examiner.*